(12) United States Patent
Hubscher et al.

(10) Patent No.: US 7,266,923 B2
(45) Date of Patent: Sep. 11, 2007

(54) CONTAINER FOR LIQUID ARRANGED FOR ATTACHMENT TO A FISHING LINE

(76) Inventors: Darin Hubscher, Box 3004, Swan River, Manitoba (CA) R0L 1Z0; Michael Chonstke, Box 218, Group 327, R.R.#3, Selkirk, Manitoba (CA) R1A 2A8

( * ) Notice: Subject to any disclaimer, the term of this patent is extended or adjusted under 35 U.S.C. 154(b) by 0 days.

(21) Appl. No.: 11/358,210

(22) Filed: Feb. 22, 2006

(65) Prior Publication Data

US 2006/0213115 A1  Sep. 28, 2006

Related U.S. Application Data

(60) Provisional application No. 60/683,316, filed on May 23, 2005, provisional application No. 60/663,761, filed on Mar. 22, 2005.

(51) Int. Cl.
*A01K 93/00* (2006.01)
*A01K 97/02* (2006.01)
*A01K 97/01* (2006.01)

(52) U.S. Cl. ............... 43/44.9; 43/44.87; 43/44.99
(58) Field of Classification Search ............ 43/44.9, 43/44.91, 44.99, 44.87, 43.14
See application file for complete search history.

(56) References Cited

U.S. PATENT DOCUMENTS

| | | | | |
|---|---|---|---|---|
| 786,597 A * | 4/1905 | Picken | | 43/44.9 |
| 2,198,286 A * | 4/1940 | Krivutza | | 43/17 |
| 2,208,240 A * | 7/1940 | Arnesen et al. | | 43/44.91 |
| 2,509,704 A * | 5/1950 | Steitwieser | | 43/44.9 |
| 2,591,558 A * | 4/1952 | Kramer | | 43/44.9 |
| 2,709,317 A * | 5/1955 | Pease, Sr. | | 43/44.99 |
| 2,718,086 A * | 9/1955 | Miner | | 43/43.14 |
| 2,719,382 A * | 10/1955 | Schachte | | 43/44.99 |
| 2,735,208 A * | 2/1956 | Bartletti | | 43/24 |
| 2,741,864 A * | 4/1956 | Shotton | | 43/44.9 |
| 2,763,088 A * | 9/1956 | Cowsert | | 43/43.14 |
| 2,772,503 A * | 12/1956 | Keller | | 43/17 |
| 2,803,913 A * | 8/1957 | Marzano | | 43/17 |
| 2,825,175 A * | 3/1958 | Skvier | | 43/44.91 |
| 2,838,196 A * | 6/1958 | Chapman | | 43/4 |
| 2,928,202 A * | 3/1960 | Smerke | | 43/44.99 |
| 2,952,937 A * | 9/1960 | Wassing | | 43/44.9 |

(Continued)

FOREIGN PATENT DOCUMENTS

DE  19807611 A1 *  9/1999

(Continued)

*Primary Examiner*—Darren W. Ark
(74) *Attorney, Agent, or Firm*—Adrian D. Battison; Michael R. Williams; Ryan W. Dupuis

(57) ABSTRACT

In ice fishing the fishing line passes through top and bottom holes in a container for liquid allow the fishing line to move through the container when pulled. A non-freezing liquid is poured from a supply into the container arranged such that the fishing line can move through the container when pulled with the non-freezing liquid preventing the line from freezing to the container or to the holes therein. The line may have a plug for butting against the bottom one of the holes to temporarily prevent the escape of liquid prior to the container being dropped into the ice fishing hole when the water will prevent the escape of the liquid.

2 Claims, 3 Drawing Sheets

U.S. PATENT DOCUMENTS

| | | | | | |
|---|---|---|---|---|---|
| 3,010,238 | A | * | 11/1961 | Crumrine, Jr. et al. | 43/43.14 |
| 3,012,359 | A | * | 12/1961 | Foster | 43/43.14 |
| 3,087,275 | A | * | 4/1963 | Svoboda | 43/44.91 |
| 3,106,034 | A | * | 10/1963 | Jonassen | 43/44.91 |
| 3,196,570 | A | * | 7/1965 | Borisch | 43/17 |
| 3,221,436 | A | * | 12/1965 | Mikus | 43/42.36 |
| 3,337,981 | A | * | 8/1967 | Bowman | 43/43.14 |
| 3,423,867 | A | * | 1/1969 | Bartletti | 43/17 |
| 3,455,056 | A | * | 7/1969 | Cultrera | 43/44.91 |
| 3,608,229 | A | * | 9/1971 | Ross | 43/43.14 |
| 3,613,289 | A | * | 10/1971 | Wehren | 43/44.9 |
| 3,698,120 | A | * | 10/1972 | Grogan | 43/43.14 |
| 3,769,740 | A | * | 11/1973 | Lang | 43/44.99 |
| 3,780,467 | A | * | 12/1973 | Lueck | 43/44.9 |
| 3,974,591 | A | * | 8/1976 | Ray | 43/43.14 |
| 3,984,935 | A | * | 10/1976 | Petersen, Jr. | 43/17 |
| 3,990,172 | A | * | 11/1976 | Hagquist | 43/43.14 |
| 4,051,620 | A | * | 10/1977 | Yasuda et al. | 43/44.99 |
| 4,242,827 | A | * | 1/1981 | Smith | 43/42.1 |
| 4,268,988 | A | * | 5/1981 | Johnson, Jr. II | 43/44.9 |
| 4,270,297 | A | * | 6/1981 | Yates | 43/17 |
| 4,438,757 | A | * | 3/1984 | Anderson | 43/4 |
| 4,449,318 | A | * | 5/1984 | Lane | 43/44.9 |
| 4,571,876 | A | * | 2/1986 | LeClair | 43/17 |
| 4,649,663 | A | * | 3/1987 | Strickland | 43/44.9 |
| 4,696,125 | A | * | 9/1987 | Rayburn | 43/43.14 |
| 4,794,720 | A | * | 1/1989 | Robertaccio | 43/43.14 |
| 4,805,336 | A | * | 2/1989 | Heyerman | 43/17 |
| 4,887,376 | A | * | 12/1989 | Sibley et al. | 43/42.06 |
| 4,942,687 | A | * | 7/1990 | Post | 43/17 |
| 4,956,934 | A | * | 9/1990 | Dahl | 43/42.35 |
| 5,033,227 | A | * | 7/1991 | Coxwell | 43/44.99 |
| 5,054,230 | A | * | 10/1991 | Woodman | 43/44.99 |
| 5,203,107 | A | * | 4/1993 | O'Brien et al. | 43/44.9 |
| 5,274,945 | A | * | 1/1994 | Ross | 43/44.91 |
| 5,279,066 | A | * | 1/1994 | Camera | 43/44.9 |
| 5,282,333 | A | * | 2/1994 | Klinkhamer | 43/4 |
| 5,381,622 | A | * | 1/1995 | Tregre | 43/44.9 |
| 5,398,440 | A | * | 3/1995 | Amundsen | 43/44.9 |
| 5,428,921 | A | * | 7/1995 | Lancieri | 43/44.99 |
| 5,581,933 | A | * | 12/1996 | Bommarito | 43/44.99 |
| 5,970,649 | A | * | 10/1999 | Alain et al. | 43/43.14 |
| 6,079,145 | A | * | 6/2000 | Barringer | 43/42.06 |
| 6,190,654 | B1 | * | 2/2001 | Hukee | 43/42 |
| 6,836,997 | B2 | * | 1/2005 | Cramsey | 43/43.14 |
| 6,935,067 | B1 | * | 8/2005 | Richter et al. | 43/4 |
| 7,043,870 | B1 | * | 5/2006 | Sydow | 43/44.99 |

FOREIGN PATENT DOCUMENTS

| | | | | |
|---|---|---|---|---|
| EP | 459053 | A1 | * | 12/1991 |
| EP | 951827 | A1 | * | 10/1999 |
| FR | 2712460 | A1 | * | 5/1995 |
| FR | 2722367 | A1 | * | 1/1996 |
| FR | 2729273 | A1 | * | 7/1996 |
| FR | 2756460 | A1 | * | 6/1998 |
| FR | 2756461 | A1 | * | 6/1998 |
| FR | 2758238 | A1 | * | 7/1998 |
| FR | 2773435 | A3 | * | 7/1999 |
| GB | 2012532 | A | * | 10/1979 |
| GB | 2295074 | A | * | 5/1996 |
| GB | 2366172 | A | * | 3/2002 |
| JP | 7-274785 | A | * | 10/1995 |
| JP | 10-23848 | A | * | 1/1998 |
| JP | 10-290652 | A | * | 11/1998 |
| JP | 11-169040 | A | * | 6/1999 |
| JP | 11-225638 | A | * | 8/1999 |
| JP | 2002-315488 | A | * | 10/2002 |
| JP | 2003-169575 | A | * | 6/2003 |
| JP | 2004-121191 | A | * | 4/2004 |
| JP | 2004-201670 | A | * | 7/2004 |
| JP | 2005-160460 | A | * | 6/2005 |

\* cited by examiner

CONTAINER FOR LIQUID ARRANGED FOR ATTACHMENT TO A FISHING LINE

This application claims priority under 35 U.S.C. 119 from the filing dates of Provisional Application 60/663,761 filed Mar. 22, 2005 and 60/683,316 filed May 23, 2005.

This invention relates to an apparatus for use in fishing which is mounted on the fishing line.

The device is particularly but not exclusively arranged as an inexpensive simple device for use in ice fishing that allows anglers to jig or set a still line without the line freezing into the ice. The line remains free to detect light nibbles and bites and or set the hook and even fight a fish.

One major problem in ice fishing is that of the line freezing in the hole as the water re-freezes. Previous devices have focused on keeping the hole free of ice by insulating the area of the water or other techniques. These devices are relatively unsatisfactory and do not have the advantages to the present invention as describer hereinafter.

A container for a liquid, which in this case is water, for attachment to a fishing line is shown in U.S. Pat. No. 5,279,066 of Phillip Camera issued Jan. 18, 1994. This patent shows a hollow container which may carry water for added weight which provides buoyancy for the fishing line and has a tube through the container which separates the line from the liquid. This is used in conjunction with an elastic portion of fishing line which passes through the tube and is attached at one end to the hook and at the other end to the line to the rod. This device has no use in nor is it designed for ice fishing.

SUMMARY OF THE INVENTION

It is one object of the invention to provide an improved apparatus for use in fishing.

According to one aspect of the invention there is provided an apparatus for use in fishing with a fishing line comprising:

a container arranged to be mounted adjacent the fishing line so as to pass through or adjacent the container;

and a liquid arranged to be placed within the container and arranged to have a freezing point below that of water such that the liquid is non-freezing during ice fishing conditions such that the fishing line can pass through the liquid, with the liquid preventing the line from freezing into the ice.

Preferably the container is closed to define a hollow interior for containing a liquid and has a top hole and a bottom hole allowing access to the hollow interior to allow the fishing line to pass through the container and the liquid therein. However the liquid may be contained in a container which applies the liquid onto the fishing line without the line passing through the container.

Preferably there is provided a stopper on the line for butting against the outside of the container at the bottom one of the holes to plug the bottom hole to prevent, temporarily while butting, the escape of the liquid.

Preferably the container can be opened by separating two parts for inserting the liquid.

Preferably each one of the parts has a respective one of the holes.

Preferably the container includes a portion for containing air for buoyancy.

Preferably the buoyancy portion is at the top.

Preferably the buoyancy portion is formed as a cap attached to the top of a lower portion containing the liquid.

Preferably the cap includes a sleeve extending downwardly from the top hole into the hollow interior of the container such that the area of the cap around the sleeve contains air for buoyancy which is prevented from escaping through the top hole by the sleeve.

Preferably the cap includes an upwardly projecting sleeve portion onto an outer surface of which can be applied a tube to stand up from the top of the container.

Preferably the container has a conical bottom wall converging toward a bottom apex at which is located the bottom hole.

According to a second aspect of the invention there is provided an apparatus for use in fishing with a fishing line comprising:

a container which is closed to define a hollow interior for containing a liquid and has a top hole and a bottom hole allowing access to the hollow interior to allow the fishing line to pass through the container;

the container being arranged to contain a liquid arranged in the container such that the fishing line can pass through the liquid in the container when pulled;

the container including a top cap portion and a bottom portion fastened to the cap portion;

the top cap portion including the top hole and a sleeve extending downwardly from the top hole into the hollow interior of the container such that the area of the cap around the sleeve contains air for buoyancy which is prevented from escaping through the top hole by the sleeve;

the sleeve terminating at a lower end of the sleeve within the hollow interior such that the hollow interior of the container below the lower end of the sleeve includes the liquid with the fishing line extending from the lower end of the sleeve through the liquid to the bottom hole.

Preferably there is provided a stopper on the fishing line for butting against the outside of the container at the bottom hole to plug the bottom hole to prevent, temporarily while butting, the escape of the liquid.

Preferably the container can be opened by separating the cap portion from the lower portion for inserting the liquid.

Preferably the container has a conical bottom wall converging toward a bottom apex at which is located the bottom hole.

According to a third aspect of the invention there is provided a liquid for use in fishing with a fishing line and a container which is closed to define a hollow interior for containing a liquid and has a top hole and a bottom hole allowing access to the hollow interior to allow the fishing line to pass through the container;

the liquid being arranged to be placed within the container and arranged to have a freezing point below that of water such that the liquid is non-freezing during ice fishing conditions such that the fishing line can pass through the liquid in the container when pulled, with the liquid preventing the line from freezing to the container or to the holes therein.

While the buoyancy is preferably provided by air located within the container either in a separate chamber or within a section of the interior. However buoyancy may be provided by a material such as polystyrene which is located on or in the container.

The device described herein thus allows the line to remain free and smooth running even though the rest of the hole is subject to icing over. Only when a fish is caught or the bait is to be removed from the hole must the angler actually clear the hole of any built up ice that has formed since his last cleaning.

The presence of the liquid on the line not only prevents the line from freezing to the container or in the ice but also prevents or inhibits the formation of ice coatings on the line which would otherwise impede the movement of the line through the holes in the container, fishing rod eyelets and or reel components.

This will allow still lines to remain free to detect a bite for hours without having to worry if it is frozen in or not as you look at it from a distance or from your cozy warm ice shack.

This device will also reduce and or even stop ice from forming on the fishing line and the eyelets of the fishing rod, and reel while an angler stands by his hole and jigs his hook up and down. Build up of ice is a bothersome inconvenience for anglers.

The container floats and is partially exposed to surface air while in the ice fishing hole. This is determined by the container material and airspace left in the partially filled container. In some cases, this may be assisted by additional flotation aids attached to the outside of the container.

The container provides a transition from surface air through a non-freezing liquid to exit below the water line where the line is protected from freezing.

The container has a hole top and bottom slightly larger than intended line diameter to minimize escape of internal fluid below the waterline and strip excessive anti-freezing solution from the line as it passes above the waterline and is exposed to the atmosphere.

The hole diameter also minimizes entry of water, snow and ice crystals into the container.

The container dispenses an non-freezing solution to the line as it passes through the container before the line is exposed to the air and re-enters the fishing rod and reel or other line collecting device.

The container may be allowed to completely freeze into newly forming ice and the line will remain free and unrestricted as it passes through the non-freezing solution.

The term non-freezing relates to any solution with a freezing point lower than 0 degrees Celsius so that it does not freeze in the water in the hole, although liquids having a lower freezing point may be used.

The container has access to allow for filling of the non-freezing solution.

A plunger attached to the line above the hook and below the container is used to seal the container from the bottom when it is removed from the water. This stops liquid from seeping out the bottom of the container in the space between the line and the container hole.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
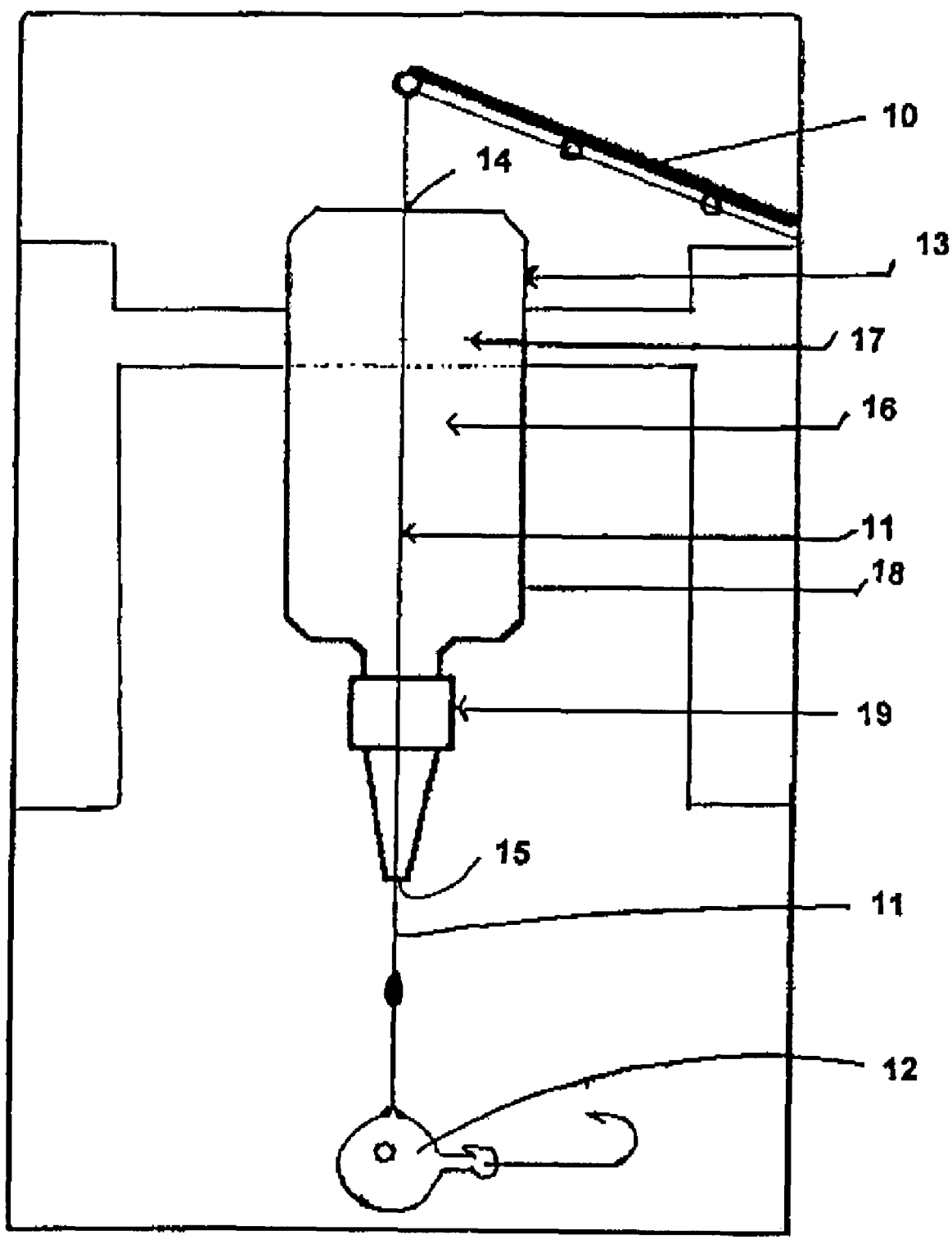
FIG. 1 is a schematic side elevation of the apparatus of the present invention located in an ice fishing hole with a rod, line and hook.

The device provides a small holding device, funnel cap and rubber bobber stopper that is placed on the line prior to attaching your hook. The line is placed through the top of the holding device through a small hole slightly larger than the line diameter. The line then passes through the holding device and out of the funnel cap that is again slightly larger than the line diameter. A cap (not shown) may be supplied to go over the end so that a custom diameter hole could be made by the angler to match the diameter of fishing line being used to maximize the performance. The line is then passed through a rubber bobber stop and on to the desired hook or lure.

The holding device when weighted will sit upright in the hole but when the weight is not detected (as when the fishing hook lays on the lake bottom) the holding device will lay on its side. Prior to placing the rig in the hole the holding device is filled with a non freezing, non-toxic liquid and then the lid is put in place. During the filling process the user would normally have their finger on the bottom hole thereby temporarily stopping the liquid from escaping until the container is released and slides down the line where it comes in contact with the rubber stop. The system is now ready to go.

Once the user lets the device go and it hangs on the line it will slide down to the rubber stop that acts as a plug and stops any liquid from seeping out until placed it in the hole. When it is positioned in the hole the non-freezing liquid is in zero gravity so that when the rubber stopper looses contact to the funnel cap, such as when the fishing line is let out, the non freezing liquid is not lost.

With the line dropped into the hole the user can start fishing. The line will freely move through the holding device even if the device freezes into the new forming ice in the hole. If the user catches a fish or wants to change the bait and ice has formed on the hole, the user can simply step near the holding device to break it free and the hole open to retrieve the catch or bait. Holes need only be cleaned when they are getting excessively thick and may prevent the user from retrieving the bait or fish with a simple push of the foot on the newly formed ice.

Bobber stops can be used on top of the holding device. This could also be used to suspend a bait at a desired level.

The user never again needs worry about the line being frozen in to set the hook at a seconds notice.

This product can be sold as a kit with one holding device with cap, a quantity of rubber stops and a starter bottle of non-toxic non freezing liquid. The invention also relates to refill bottles. The liquid is preferably clear to reduce the appearance of unsightly accidental spillage of the non-freezing liquid.

The non-freezing solution, as it may leak slightly into the water, is environmentally friendly of a non-toxic formula which includes materials such as the use of Propylene Glycol with or without fish attractants and or various types of alcohol with or without fish attractants.

Figure 2:
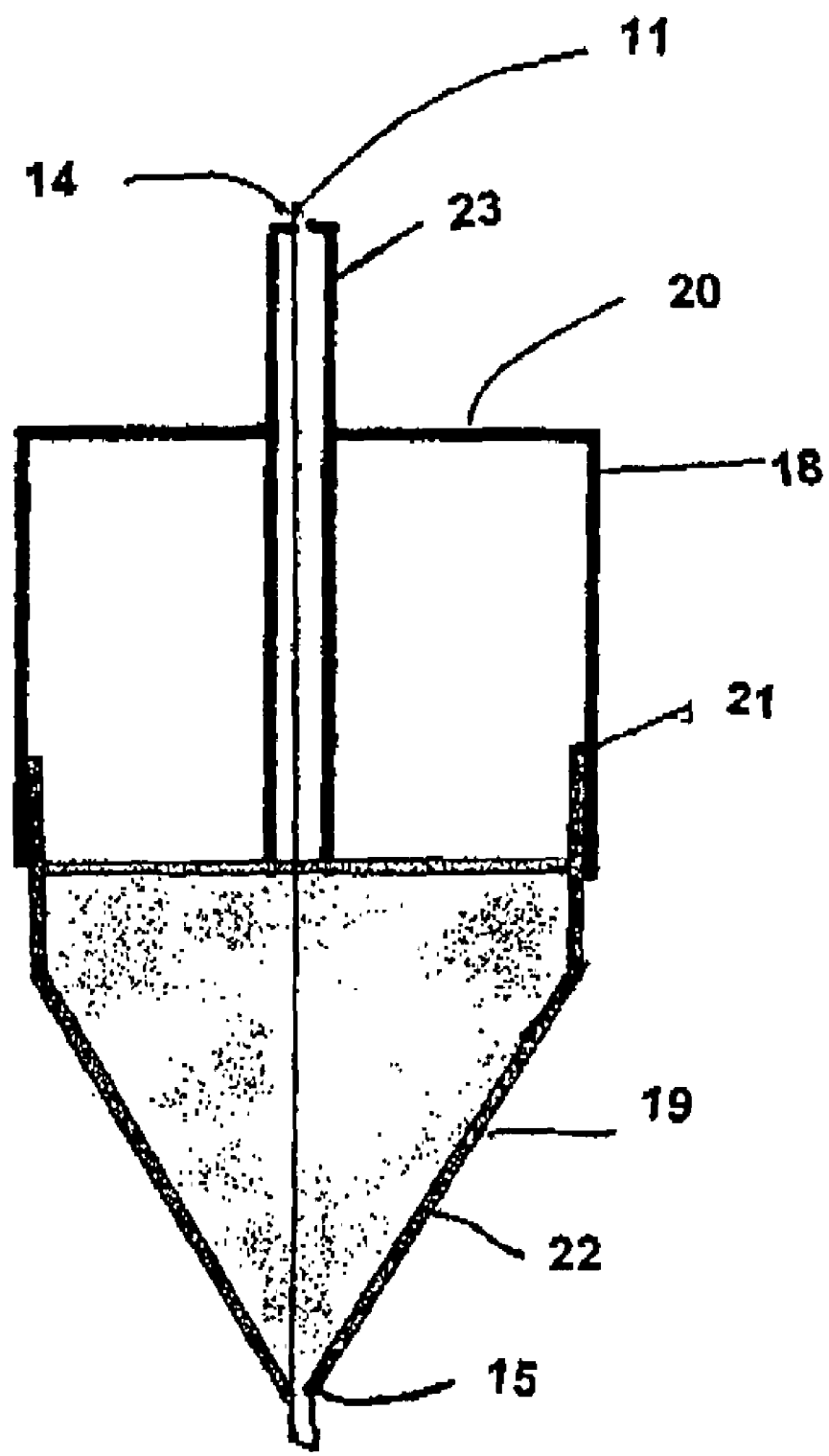
FIG. 2 is a schematic side elevation of a second embodiment of the apparatus of the present invention.
Figure 3:
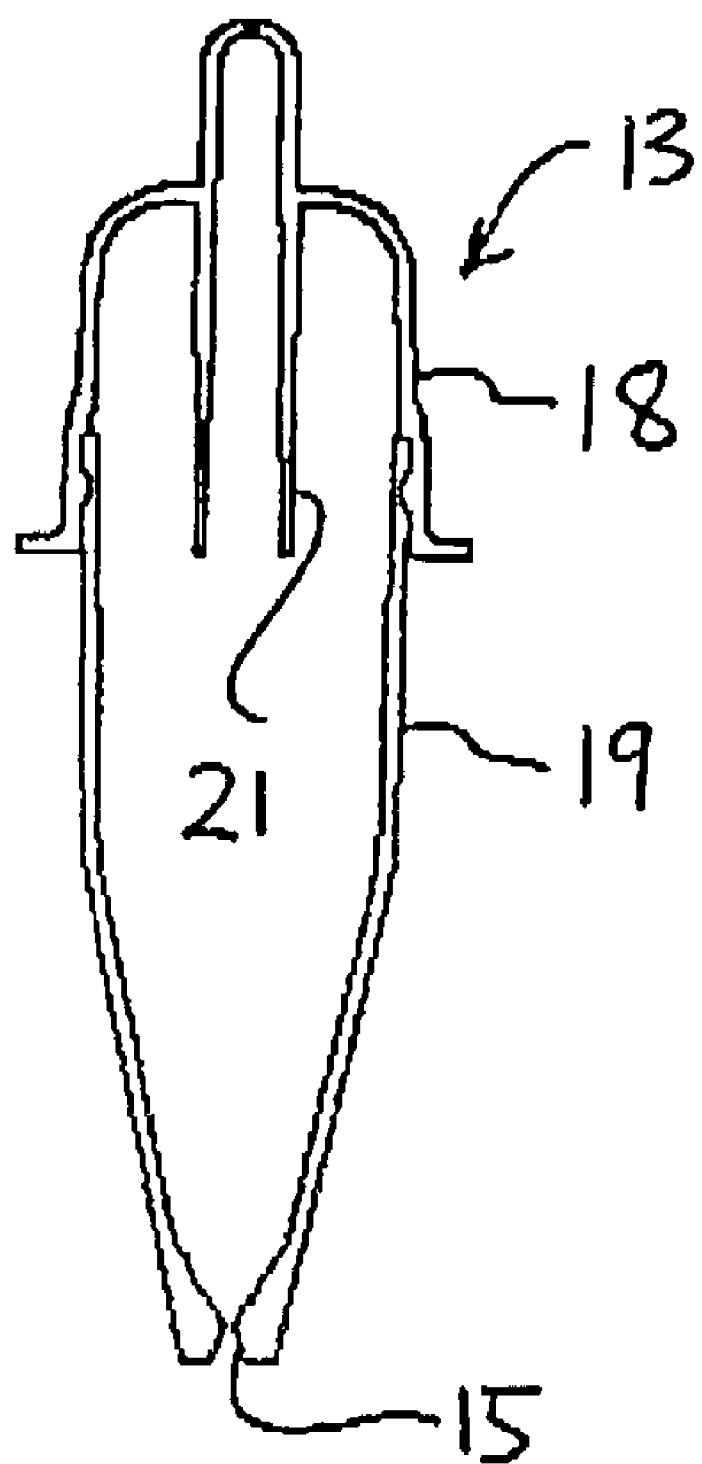
FIG. 3 is a cross sectional view of a modified embodiment similar to that of FIG. 2 of the apparatus of the present invention.

Referring now to the figures, there is shown a fishing rod 10 having a line 11 and a hook 12. The container is indicated at 13 and includes a top hole 14 and a bottom hole 15. Inside the container is the liquid 16 up to a liquid level 17. The container is formed from a top portion 18 and a bottom portion 19. In this arrangement, the Ice stopper design uses entrapped air to aid in the buoyancy of the liquid holding container. Thus the upper cap 18 can be snap fastened over the lower portion 19 containing the anti-freeze liquid. The upper cap 18 as shown in FIGS. 2 and 3 is cylindrical and has a circular top face 20 which is flat. There is a tube 21 passing through the cap and terminating at the bottom of the cap above the liquid level in the lower chamber. This traps air in the upper part to maintain buoyancy of the device. The lower chamber has the bottom hole at a bottom apex of a conical bottom wall 22. The line passes through the tube 21 into the lower container 19 and through the liquid 16 therein to the bottom hole to pass into the water. An upper tubular stem 23 projects as a tube above the top face 20 of the upper cap.

The upward portion 23 designed to accept a straw over the extension to add visibility for use as an open water slip float.

The downward extension 21 into the cap lowers the entry point and thus creates an area around the inward extension that traps air and provides the necessary buoyancy.

The top half is designed to trap air so alternative buoyancy methods would not be required. The hollow stem dropping down from the top center of the cap traps air around it. This still provides for passage of a line thru a hole in the top middle of the container without allowing the air to escape.

The stem protruding upward has a function of allowing a straw or light tubing to slide over and be firmly attached to the container. This is to aid in visibility from a distance should the user want to do so. The device could be used with or without the stem extension. The optional stem extension would normally be used in a summer application where users want visual contact with the device from a greater distance.

The bottom portion of the container has the hole entrance from the outside bevelled to allow the rubber stopper 30 on the line to center and form a snug seal so there is no liquid escaping when the device is out of water. Any time the device is removed from the water the liquid inside will want to escape due to the forces of gravity. It is prevented from doing so by the rubber stopper on the line plugging the bottom hole.

The bottom portion is tapered right to the exit hole to assist in threading the line thru the device from the top down.

The device can also be used as a long range casting slip float in a summer application if an additional stop is added to the line above the device. In this situation the device uses the weight of the liquid (usually water in above freezing condition) contained within to cast considerably long distances. The weight of the liquid is neutralized once it is back at rest in the water. At this point the entrapped air is what is used to give the float its buoyancy.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. An apparatus for use in fishing with a fishing line comprising:

a fishing line having a hook at a lower end;

a container which is closed to define a hollow interior for containing a liquid;

the container having a top hole and a bottom hole through which the fishing line passes so that a portion of the fishing line is located within the container;

the container being closed apart from the top hole and the bottom hole and containing a liquid such that the fishing line passes through the liquid in the container when pulled;

the container including a top cap portion and a bottom portion fastened to the cap portion such that the container can be opened by separating the top cap and bottom portions for inserting the liquid;

the top cap portion including the top hole and a sleeve extending downwardly from the top hole into the hollow interior of the container such that an area within the top cap portion around the sleeve contains air for buoyancy which is prevented from escaping through the top hole by the sleeve, the sleeve being spaced interiorly from an inner surface the bottom portion such that no portion of the sleeve contacts the inner surface of the bottom portion when the bottom portion is fastened to the top cap portion;

the sleeve terminating at a lower end of the sleeve within the hollow interior such that the hollow interior of the container below the lower end of the sleeve includes the liquid with the fishing line extending from the lower end of the sleeve through the liquid and through the bottom hole;

the liquid within the container having a freezing point below that of water such that the liquid is non-freezing during ice fishing conditions such that the fishing line can pass through the liquid, with the liquid preventing the line from freezing into the ice.

2. An apparatus for use in fishing with a fishing line comprising:

a fishing line having a hook at a lower end;

a container which is closed to define a hollow interior for containing a liquid;

the container having a top hole and a bottom hole through which the fishing line passes so that a portion of the fishing line is located within the container;

the container being closed apart from the top hole and the bottom hole and containing a liquid such that the fishing line passes through the liquid in the container when pulled;

the container including a top cap portion and a bottom portion fastened to the cap portion such that the container can be opened by separating the top car and bottom portions for inserting the liquid;

the top cap portion including the top hole and a sleeve extending downwardly from the top hole into the hollow interior of the container such that an area within the top cap portion around the sleeve contains air for buoyancy which is prevented from escaping through the top hole by the sleeve;

the sleeve terminating at a lower end of the sleeve within the hollow interior such that the hollow interior of the container below the lower end of the sleeve includes the liquid with the fishing line extending from the lower end of the sleeve through the liquid and through the bottom hole;

the liquid within the container having a freezing point below that of water such that the liquid is non-freezing during ice fishing conditions such that the fishing line can pass through the liquid, with the liquid preventing the line from freezing into the ice;

wherein there is provided a rubber stopper on the line for abutting against an outside of the container at the bottom hole and wherein the bottom hole has a bottom hole entrance which is beveled to receive the rubber stopper to plug the bottom hole to prevent, temporarily while butting, the escape of the liquid prior to the container being dropped into an ice fishing hole when the water will prevent the escape of the liquid.

* * * * *